May 6, 1958 W. P. HOLIN 2,833,377
RAILWAY VEHICLE BRAKE RIGGING
Filed Nov. 1, 1954 2 Sheets-Sheet 1

INVENTOR
William F. Holin
BY J. C. Thorpe
ATTORNEY

May 6, 1958 W. P. HOLIN 2,833,377
RAILWAY VEHICLE BRAKE RIGGING
Filed Nov. 1, 1954 2 Sheets-Sheet 2

INVENTOR
William F. Holin
BY J. C. Thorpe
ATTORNEY

United States Patent Office 2,833,377
Patented May 6, 1958

2,833,377

RAILWAY VEHICLE BRAKE RIGGING

William F. Holin, Riverside, Ill., assignor to General Motors Corporation, Detroit, Mich., a corporation of Delaware Application November 1, 1954, Serial No. 465,889

1 Claim. (Cl. 188—33)

This invention relates generally to brake rigging for railway vehicles and more particularly to improved connections between certain brake levers of railway brake rigging. There are several objections to the type of brake rigging currently employed on most railway vehicle trucks. Probably the greatest objection is one of cost. Means are constantly sought to decrease the cost thereof. Another objection to this class of brake rigging is the general looseness thereof which has been due to the need for connections between certain brake levers which must move linearly, angularly and rotatably with respect to each other resulting in certain amounts of lost motion, etc. A further objection is that the connections between horizontal and vertical brake levers are relatively difficult to assemble and disassemble resulting in considerable expenditures of time and money.

It is therefore an object of this invention to provide in a railway vehicle brake rigging a connection between certain vertical and horizontal brake levers which will eliminate lost motion therebetween; substantially reduce the number of parts formerly used to make such a connection thereby achieving a substantial reduction in cost; and readily lend itself to relatively easy assembly and disassembly.

For a fuller understanding of the objects of this invention reference may be had to the accompanying detailed description and drawings, in which.

Figure 1:
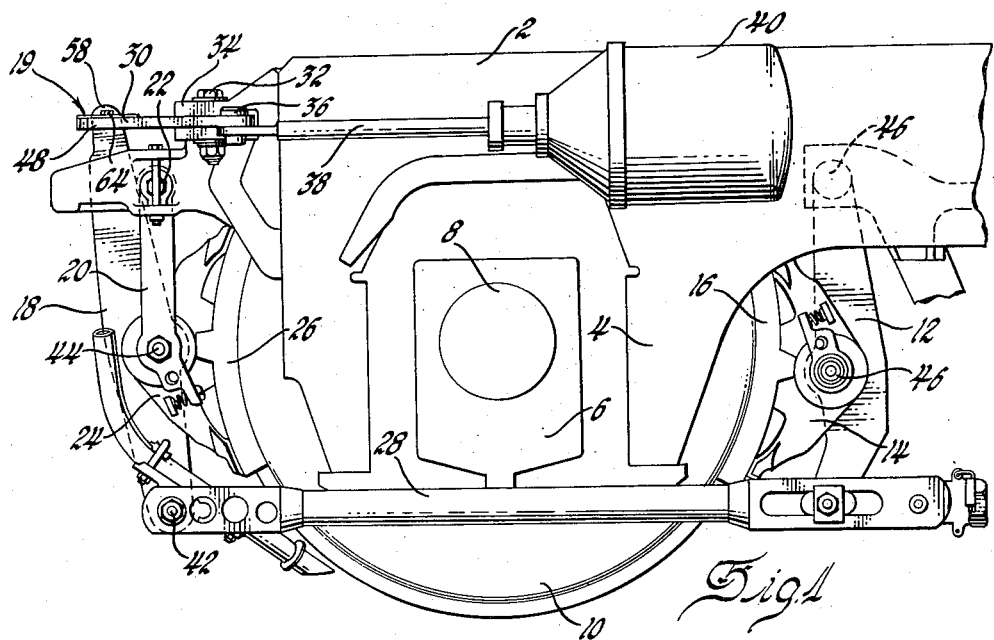
Fig. 1 is a side view in elevation of a portion of a railway vehicle truck having a clasp brake rigging appended thereto incorporating a new connection between a live vertical brake lever and a horizontal lever included as part of the brake operating mechanism.
Figure 2:
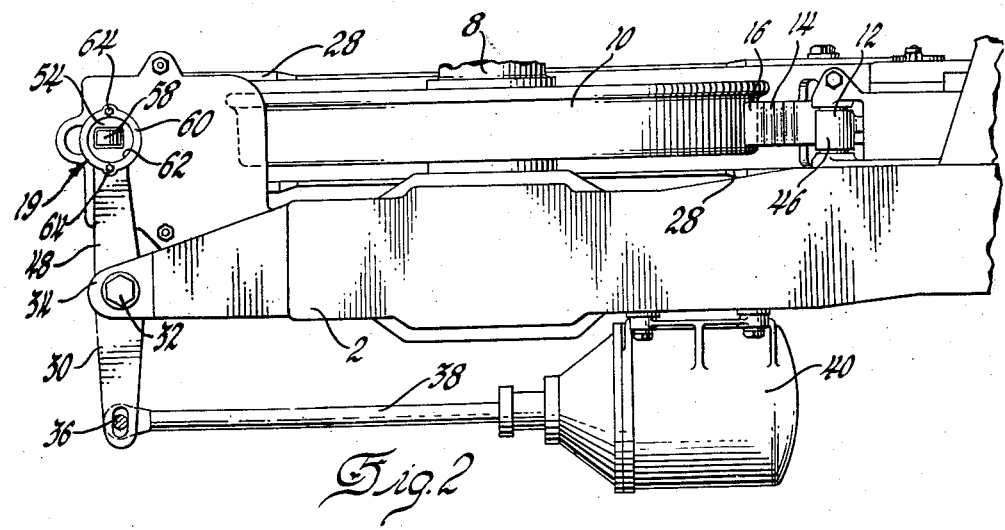
Fig. 2 is a plan view of a portion of the truck further illustrating how the brake rigging has been applied thereto and the new connection between the horizontal brake lever and the live vertical brake lever.

Referring now to the accompanying drawings and particularly to Figs. 1 and 2, a portion of a railway vehicle truck frame indicated by the numeral 2 is shown provided with the usual pedestal assemblies 4 between which is positioned the usual journal box assembly 6 in which is journaled for rotation an axle 8 having a railway vehicle wheel 10 secured thereto. Pivotally supported on the truck frame 2 at 46 is a vertical dead brake lever 12 to which is pivotally attached intermediate the ends thereof the usual brake head 14 carrying therewith a brake shoe 16. A vertical live brake lever 18 is pivotally supported intermediate the ends thereof at 44 by means of oppositely disposed strap hangers 20 pivotally attached to the frame 2 at point 22. The vertical live brake lever 18 also has pivotally attached thereto at 44 a brake head 24 including a brake shoe 26 for engaging the opposite side of wheel 10. Pivotally connected to and linking the lower ends of the dead brake lever 12 and live brake lever 18 are the usual horizontal tension bars 28. In order to actuate the live brake lever 18 a horizontal brake lever 30 is pivotally supported intermediate the ends thereof on the frame 2 at point 32 by means of the clevis assembly indicated by a numeral 34. One end of this horizontal brake lever 30 is operatively connected to the upper end of the live brake lever 18 by the novel connection indicated generally by a numeral 19 which will be described with more particularity shortly. The opposite end of the horizontal brake lever 30 is connected by means of a pin 36 to the operating rod 38 of an air cylinder assembly 40.

The brake rigging, as observed, is of the clasp type and operates in the usual manner by energizing the air cylinder assembly 40 to cause the operating rod 38 to move to the left as viewed in Figs. 1 and 2 of the drawings. Such movement of the operating rod 38 causes horizontal brake lever 30 to pivot in a clockwise direction as viewed in Fig. 2 of the drawings thereby moving the upper end of vertical live brake lever 18 toward the wheel 10 and causing lever 18 to initially pivot about the point 42 where it is pivotally attached to the horizontal tension bars 28. This clockwise pivotal movement of lever 18 about point 42 will cause the brake shoe 26 to engage the wheel 10, after which any further pivotal movement of lever 18 will take place about point 44 where the lever is pivotally attached to the hangers 20 and the brake head 24. Clockwise pivotal movement of brake lever 18 about point 44, as viewed in Fig. 1, will cause the horizontal tension bars 28 to move to the left as viewed in the figure thereby causing dead brake lever 12 to pivot clockwise about the point 46. Sufficient clockwise movement of dead brake lever 12 about point 46 will cause the brake shoe 16 to engage the wheel 10 and full braking will then be achieved.

Figure 3:
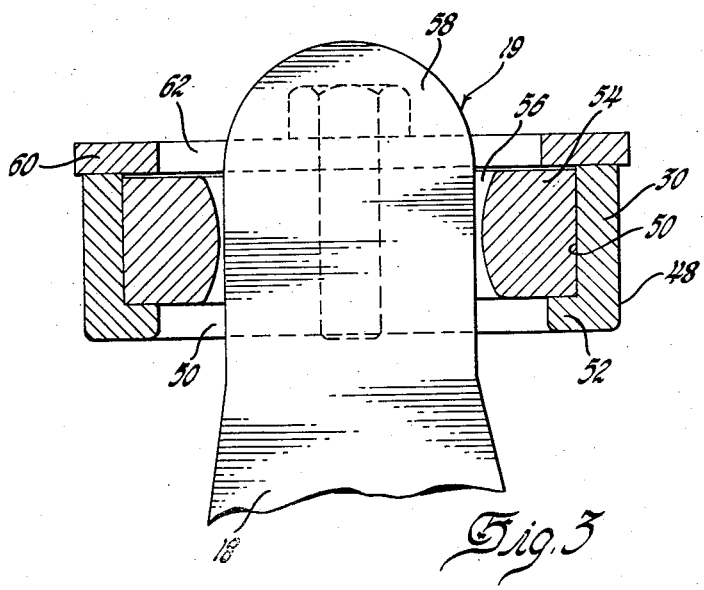
Fig. 3 is an enlarged view in elevation of parts in section taken on the line 3—3 of Fig. 4 illustrating in greater detail the improved connection between the live vertical brake lever and the horizontal brake lever.
Figure 4:
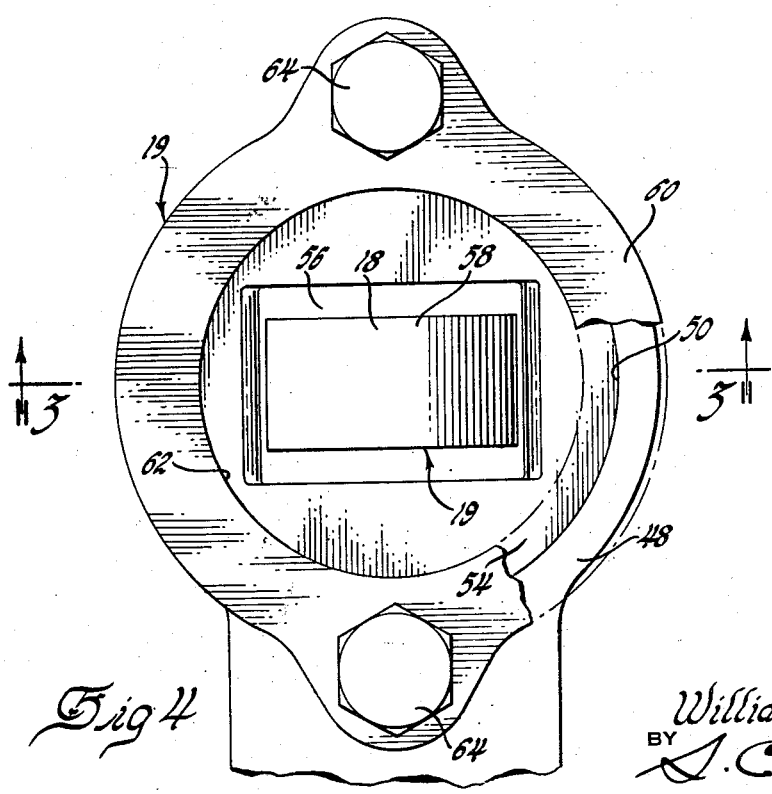
Fig. 4 is an enlarged view in plan of the improved connection with parts broken away to illustrate how a bushing is rotatably secured in an end of the horizontal brake lever and retained therein by means of a cap secured to the horizontal brake lever.

Referring now to Figs. 3 and 4 in addition to Figs. 1 and 2, the improved connection 19 between live vertical brake lever 18 and horizontal brake lever 30 will be described. An end 48 of horizontal brake lever 30 has been enlarged and is provided with a vertical opening or hole 50 extending therethrough. The hole 50 is reduced in size at the lower end thereof by means of a flange 52. Residing in the circular opening or hole 50 and seated on the flange 52 is a bushing 54. The bushing 54 has vertically extending therethrough a rectangularly shaped hole or opening 56 through which extends the upper end 58 of the vertical live brake lever 18. It will be observed from Fig. 4 that the upper end 58 of the vertical brake lever 18 has a cross section which is also rectangular in shape so that any substantial rotating movement of the bushing 54 with respect thereto is prevented. In order to retain the bushing in the opening 56 and seated on the flange 52, a cap or flat plate 60 having opening 62 therein is secured to the upper side of the end 48 of the horizontal brake lever 30 by means of studs 64.

It should be emphasized at this point that while the bushing 54 may be made of any suitable material it is preferable to make it of a softer material than that of the end 48 of the lever 30 and the upper end 58 of the live vertical brake lever. In this way most or practically all of the wear will take place in the bushing 54 which can be quickly and easily replaced by merely removing the cap 60, removing the old worn bushing and inserting a new bushing.

The operation of this new connection 19 between horizontal and vertical brake levers 30 and 18, respectively, is as follows: as the lever 30 pivots about the point 32 on frame 2 the bushing 54 rotates in the opening 50 on the flange 52 thereby accommodating the relative rotatable movement that must take place between the upper end 58 of the vertical brake lever 18 and the end 48 of the horizontal brake lever 30. As the lever 18 pivots to a more nearly vertical position about the points 42 and 44 its upper end moves vertically with respect to the horizontal lever 30. Such movement is accommodated by the rectangular slot in the bushing 56 which enables the upper end 58 to move up and down relative thereto.

From the foregoing it may be observed that a joint between live vertical brake lever and horizontal operating lever substantially reduces the number of parts formerly needed to make such a connection. The service life of such a connection is substantially lengthened because there are fewer moving parts involved and the bushing 54 will take most of the wear. The simplicity of the connection expedites the assembly and disassembly thereof for maintenance and repair purposes. A more positive acting connection has been provided which eliminates looseness and other objectionable operating features prevalent in this class of brake lever connections.

I claim:

In a brake rigging for a railway vehicle truck, a connection between a substantially vertical brake lever movably supported on said truck and having wheel engaging means adjacent a wheel thereof and means to move said brake lever relative to said wheel including a substantially horizontal operating lever movably supported on said truck comprising a portion on said operating lever having a vertically extending opening therein, a flange in said opening spaced from the upper end thereof, a bushing in said opening rotatably supported on said flange, said bushing having a rectangularly shaped guide hole extending vertically therethrough, a cooperating rectangularly shaped upper end on said vertical lever received in the rectangular hole in said bushing whereby said end of said vertical brake lever may move vertically with respect to said bushing and said bushing acts as a rotatable bearing journaling the upper end of said vertical lever in said opening while allowing axial movement thereof, and a cap secured to said operating lever and having a hole therein through which said upper end extends, said cap rotatably retaining said bushing in said opening.

References Cited in the file of this patent

UNITED STATES PATENTS

| | | |
|---|---|---|
| 1,224,835 | Blackstone | May 1, 1917 |
| 1,417,203 | Redford | May 23, 1922 |
| 2,163,534 | Baselt | June 20, 1939 |
| 2,558,103 | Ruckstahl | June 26, 1951 |